US011790246B2

(12) United States Patent
Trim et al.

(10) Patent No.: US 11,790,246 B2
(45) Date of Patent: Oct. 17, 2023

(54) DYNAMIC MEDIA USE CONTROL SERVICE

(71) Applicant: International Business Machines Corporation, Armonk, NY (US)

(72) Inventors: Craig M. Trim, Glendale, CA (US); Victor Povar, Burnaby (CA); Gandhi Sivakumar, Melbourne (AU); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 16/279,308

(22) Filed: Feb. 19, 2019

(65) Prior Publication Data
US 2020/0265322 A1  Aug. 20, 2020

(51) Int. Cl.
G06N 5/02 (2023.01)
G06F 21/31 (2013.01)
H04L 9/40 (2022.01)
H04L 67/50 (2022.01)

(52) U.S. Cl.
CPC .............. G06N 5/02 (2013.01); G06F 21/31 (2013.01); H04L 63/102 (2013.01); H04L 67/535 (2022.05)

(58) Field of Classification Search
None
See application file for complete search history.

(56) References Cited

U.S. PATENT DOCUMENTS

| | | | |
|---|---|---|---|
| 8,640,190 B1 | 1/2014 | Banerjee | |
| 10,511,688 B2* | 12/2019 | Harrang | H04L 65/80 |
| 10,754,556 B2* | 8/2020 | Mulholland | G06F 12/0253 |
| 10,771,619 B1* | 9/2020 | Puwula | H04M 1/72454 |
| 11,276,287 B2* | 3/2022 | Oppenheimer | H04W 4/029 |
| 2006/0156209 A1* | 7/2006 | Matsuura | H04M 1/72472 714/E11.207 |
| 2014/0207724 A1 | 7/2014 | Ledenev et al. | |
| 2017/0085569 A1 | 3/2017 | Gupta et al. | |
| 2017/0134458 A1* | 5/2017 | Lau | H04M 15/8016 |
| 2018/0136950 A1 | 5/2018 | Lefevre et al. | |
| 2018/0212959 A1* | 7/2018 | Mukherjee | H04N 21/4415 |
| 2019/0019426 A1* | 1/2019 | Chambers | H04L 67/535 |
| 2020/0033812 A1* | 1/2020 | Neyens | G06Q 30/0633 |
| 2020/0175167 A1* | 6/2020 | Wilczynski | G06F 21/6209 |
| 2021/0084670 A1* | 3/2021 | Chauhan | H04W 72/1252 |
| 2022/0164879 A1* | 5/2022 | Celia | G06K 9/6215 |
| 2022/0172206 A1* | 6/2022 | Celia | H04L 9/3213 |
| 2022/0174543 A1* | 6/2022 | Meempat | H04W 28/0812 |

OTHER PUBLICATIONS

P. Mell, et al. *"The NIST Definition of Cloud Computing"*, NIST Special Publication 800-145, Sep. 2011, Gaithersburg, MD.

* cited by examiner

*Primary Examiner* — Otis L Thompson, Jr.
(74) *Attorney, Agent, or Firm* — Randy Emilio Tejeda; George S. Blasiak; Heslin Rothenberg Farley & Mesiti, P.C.

(57) ABSTRACT

Methods, computer program products, and systems are presented. The methods include, for instance: obtaining prediction data that are indicative of media use behaviors of a user over a period of time. Prediction on a pattern of media use behaviors of the user including media content, hours spent on the media content, and the period of time is made. Base on the predicted media use pattern corresponding to a current stage in the period of time, a media use control rule for the user on a controlled device is generated.

20 Claims, 5 Drawing Sheets

DYNAMIC MEDIA USE CONTROL SERVICE

TECHNICAL FIELD

The present disclosure relates to cognitive analysis and predictions, and more particularly to methods, computer program products, and systems for dynamically controlling media use based on changes in media environment and desired use pattern.

BACKGROUND

In the present media environment, most of media devices have parental control functionalities in order to ensure that children have access to only age-appropriate contents or to a certain types of desired contents. Conventional media devices implement parental control rules that are manually configured by parents, who have supervisory authorization for setting the parental control rules. Certain media devices have a preinstalled software updated online while in service, and the parental control program and rules are also updated in a new version of software. In addition to the parental control functionalities preinstalled in devices, various apps for more selective and specialized parental control functionalities than those provided by manufacturers of the devices are also widely available, particularly on personal information devices such as smartphones.

SUMMARY

The shortcomings of the prior art are overcome, and additional advantages are provided, through the provision, in one aspect, of a method. The method includes, for instance: obtaining, by one or more processor, prediction data that are indicative of media use behaviors of a user over a period of time; predicting, by the one or more processor, a pattern of the media use behaviors including media content, hours spent on the media content, and the period of time during which the user would behave as predicted; and generating, by the one or more processor, a media use control rule for the user on a controlled device according to the predicted media use pattern corresponding to a current stage in the period of time.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
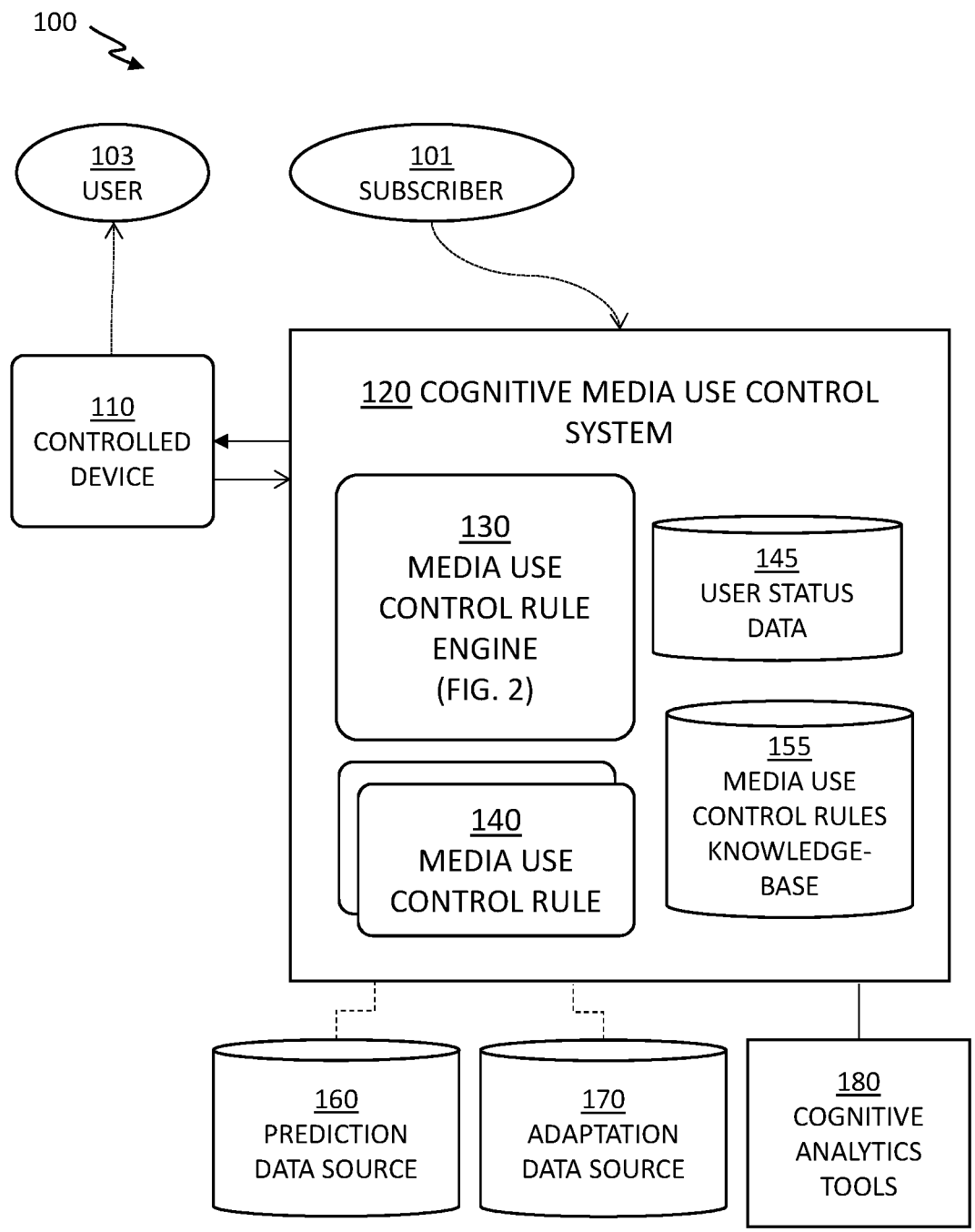
FIG. 1 depicts a system for dynamic media use control service, in accordance with one or more embodiments set forth herein.

FIG. 1 depicts a system 100 for dynamic media use control service, in accordance with one or more embodiments set forth herein.

The system 100 includes a cognitive media use control system 120 that provides the dynamic media use control service. A subscriber 101 signs up for the dynamic media use control service in order to supervise media use by a user 103 on a controlled device 110.

The subscriber 101 administers and configures the cognitive media use control system 120 with respect to settings of media use control rules to be applied on the controlled device, exercising the details of supervision exercised by the dynamic media use control service for the user 103. In this specification, the cognitive media use control system 120 communicates with the subscriber 101 by a subscriber account of the cognitive media use control system 120. The subscriber 101 accesses the cognitive media use control system 120 by use of a personal computing device, which is not shown.

The controlled device 110 is a computing/communication/entertainment device on which the dynamic media use control service is performed. The user 103 can have more than one controlled device 110, which would be respectively controlled by the cognitive media use control system 120 in a manner consistent with the rest of controlled devices for the user 103. Examples of the controlled device 110 include, but are not limited to, a smartphone, a tablet, a laptop, an electronic reader, a game console, and any type of electronic media players with or without Internet communication functionalities.

The cognitive media use control system 120 includes a media use control rule engine 130, user status data 145, and a media use control rules knowledgebase 155. The media use control rule engine 130 generates one or more media use control rule 140.

The cognitive media use control system 120 is operatively coupled to one or more prediction data source 160, one or more adaptation data source 170, and external cognitive analytics tools 180.

Embodiments of the present invention recognize that conventional parental control functionalities on media devices are manually set by parents turning on or off certain control options to statically block certain media contents that are not age-appropriate for children. When parents uses a passcode or similar method on the device, children can easily learn the code and change the settings to gain access to media contents not intended by parents. Embodiments of the present invention recognize that with emerging mobile communication technology, media access is highly personalized and extensively used over a long period of time in personal spaces, and accordingly, supervising media content access for children who are often much better skilled with media devices than parents would be overwhelming for parents. Embodiments of the present invention also recognize that, because media environment is rapidly and dynamically changing, conventional method of parental control in such media environment can hardly ensure proper media usage by minor children. Embodiments of the present invention also recognize that current media environment available through the Internet and accesses to it is highly valued by minor children, particularly with certain amount of pressure from social groups like friends and schoolmates.

The subscriber 101, upon subscription, explicitly authorizes accesses by the cognitive media use control system 120 to information on the subscriber 101 and the user 103 in various data sources (160, 170) in order to facilitate the dynamic media use control service. In the context of the dynamic media control service, the subscriber 101 can authorize on behalf of the user 103 accesses by the cognitive media use control system 120 to data sources for information on the user 103. If applicable, the user 103 and the subscriber 101 can respectively authorize access to the personal information by the cognitive media use control system 120. The data sources (160, 170) described herein operate according to respective privacy policies and rules regarding information release on both the subscriber 101 and the user 103. The cognitive media use control system 120 keeps the collected data in a secure storage with encryption while the dynamic media use control service continues for the subscriber 101 and the user 103. The cognitive media use control system 120, in the meantime, builds statistically a pattern of media usage and media control rules serviced accordingly in the media use control rules knowledgebase 155, without information identifying the subscriber 101 and the user 103. The cognitive media use control system 120 destroys all information identifying the subscriber 101 and the user 103 from the secure storage once the dynamic media use control service is terminated for the subscriber 101 and the user 103.

In certain embodiments of the present invention, the subscriber 101 is a parent, or a legal guardian, of the user 103 who is a minor, and the dynamic media use control service is offered as a form parental control service over various media access devices including the controlled device 110 used by the user 103. In other embodiments of the present invention, the subscriber 101 and the user 103 can be in any other type of legal relationship in which the subscriber 101 is authorized to supervise media usage of the user 103.

As noted the cognitive media use control system 120 includes the media use control rule engine 130, one or more media use control rule 140, the user status data 145, and the media use control rules knowledgebase 155.

The media use control rule 140 is generated by the media use control rule engine 130 based on the prediction data, the adaptation data, the user status data 145, and information available from the media use control rule knowledgebase 155, as described herein. The media use control rule 140 controls accesses to media contents in a media environment by the user 103 through the controlled device 110, with respect to types of the media contents that can be accessed by the user 103, how many hours the user 103 can spent on the permitted media contents, respectively and/or as a whole, with respect to the age of the user 103 or otherwise respective developmental stages of the user 103. Exemplary media contents in the media environment include, but are not limited to, websites, video games, mobile apps, social media, emails, text messengers, video chats, voice calls, and combinations thereof that can be accessed via the controlled device 110. The media use control rule engine 130 compiles a list of website contents that the user 103 can access and use to the benefit of the user 103 in the current developmental stage as analyzed based on the prediction data, based on the content and age-appropriateness of the respective website contents and as a part of the media use control rule 140. The media use control rule 140 also controls how many hours and at which hours the user 103 can use the controlled device 110.

The user status data 145 include information regarding a current state of the user 103, including demographic information and other basic personal information, including age, gender, school performance, and various online accounts from which input data to the cognitive media use control system 120 can be obtained. The user status data 145 can be established based on, for example, a user profile generated upon subscription of the dynamic media use control service.

The media use control rule engine 130 continuously updates the user status data 145 by monitoring various media use behavior of the user 103 and by storing the monitored media use behavior data. Examples of the media use behavior of the user 103 for the purpose of the user status data 145 include, but are not limited to, various social media postings by the user 103, calendar entries of the user 103, text messages sent or received by the user 103, media content access patterns on the controlled device 110, etc.

The media use control rules knowledgebase 155 includes various general knowledge on media use that can be utilized by the media use control rule engine 130 in generating the one or more media use control rule 140, such as certain media contents classification, ratings for target audience age as in conventional media rating systems, and age groups, school grade systems, studies on media consumption, trends and statistics on media use and various effects, or the like. The media use control rule engine 130 generates the one or more media use control rule 140 and stores in the media use control rules knowledgebase 155, along with context data for respective media use control rules, in building up the media use control rules knowledgebase 155.

The cognitive media use control system 120 is coupled to the one or more adaptation data source 170, the one or more prediction data source 160, and the external cognitive analytics tools 180.

The cognitive analytics tools 180 perform, on the media contents collected from the adaptation data source 170, for example, image recognition and analysis for images of the collected media contents, content classification based on natural language analysis for texts of the collected media contents, as well as data modeling and prediction of media use behaviors of the user 103 based on preconfigured parameters of modeled data. The cognitive analytics tools 180 are presently available and are not within the scope of this specification. However, the parameters of analyses are selected for the purpose of the dynamic media use control service, and how the selected parameters contribute to the operations of the cognitive media use control system 120 as described herein are within the scope of the present invention.

A prediction data source 160 indicates various sources of data utilized in predicting a pattern in media use behaviors of the user 103 over time, and factors to be considered in generating the media use rules for the user 103 according to changes in the media use behaviors over time. Accordingly, the prediction data obtained from the prediction data source 160 are primarily relevant with the development of the user 103 over time, in relation with social groups of the user 103 and their behavioral characteristics, which dictate how the media use control rule should be formed and applied for the user 103. The prediction data can further include the policy of the subscriber 101 as to, for example, what kind of media content should be desirable for the user 103, how many hours and in which hours the user 103 can access media contents and/or use the controlled device.

Examples of the prediction data include, but are not limited to, general personal background information on the subscriber 101 and the user 103, including demographic information of the subscriber 101 and the user 103, relationship between the subscriber 101 and the user 103, daily routines and activities schedule for the user 103, basic personal information and contact information for the subscriber 101 including availability of the subscriber 101 for any contacts, basic personal information and contact information for friends and member of social groups for the user 103, personal goals and future plans of the user 103, calendar events of the user 103, social network accounts of the user 103 and access authorizations for the subscriber 101, school performance and activity records for the user 103.

For example, Subscriber A signs up for User B who is a teenage child with a particular interest in movies and wishes to go to a film school. Subscriber A supports User B with the plan and wishes to use the dynamic media use control service for User B to have as much access to rare movies and information relevant to film study. For User B, the dynamic media use control service initially provides the media use control rule 140 with no hourly limit on the use of the controlled device 110 for accessing sites on film studies and movie making within preapproved categories by Subscriber A, and the controlled device 110 is registered with a prominent on-demand content provider, such that User B can take full advantage of media access toward the goal shared by Subscriber A and User B.

In the next year, the dynamic media use control service would adjust the media use control rule 140 for User B based on media use behavior of the past year by User B, new contents available from the Internet, and any further input from Subscriber A. If a certain new movie streaming site that User B can be benefited from but currently not accessible to User B as it is not within the preapproved categories has launched, then the media use control rule engine 130 recommends the new site to be included in the accessible site categories to Subscriber A.

In another example, Subscriber J signs up for User K who is of a similar age as User B from the previous example, but has issues with excessive media use and recently suspended from school. Subscriber J wants User K to be back on track and wishes to cut down media time for User K as much as possible and to allow only media contents necessary for school classes so that User K can resolve the media use issue. For User K, the media use control rule 140 as provided by the dynamic media use control service would initially limit Internet access to 2 hours a day with access to school-sanctioned websites only, with no access to social media accounts, streaming services, and game sites, where User K had spent excessive time in the past, as prescribed by the Subscriber J.

For next three months, User K shows some improvement with the report card, had not exceed the time limit, and had very few attempts to access the blocked sites according to the user status data 145. The media use control rule engine 130 provides a monthly report to Subscriber J with a recommendation that, because a majority of schoolmates of User K actively communicate over a certain social media on school events, sports games, class assignments, and projects, it would be beneficial for User K to access the same social media, and the daily time limit can be increased accordingly. The media use control rule engine 130 receives feedback from Subscriber K and generates a new media use control rule if necessary.

An adaptation data source 170 offers various data regarding changes in media content environment corresponding to respective time period. The media use control rule engine 130 analyzes changes in media content environment over time in terms of developmental stages and media use needs of the user 103, as previously predicted based on the prediction data or specified by the media use policy for the user 103. Examples of the adaptation data as collected from the adaptation data source 170 include, but are not limited to, newly released media contents such as books, movies, newspapers, magazines, video games, new mobile apps and social media, and any other media content, information regarding the newly released media contents such as reviews, news articles, social media postings, comments and texts, any activities relevant to the newly released media contents and preexisting media contents, responses of social groups to the newly released media contents, or trends in media use amongst the social groups of the user 103, etc.

The media use control rule engine 130 collects data from the prediction data source 160 and makes predictions on developmental stages of the user 103 in terms of media use behavior, often corresponding to a school grade of the user 103. The media use control rule engine 130 also predicts on social groups influencing the media use behavior of the user 103, based on relevant data items of the prediction data. The media use control rule engine 130 generates an initial media use control rule based on the current stage of the user 103. The media use control rule engine 130 analyzes the adaptation data regarding changes in media content environment from the adaptation data source 170 by use of the cognitive analytics tool 180. The media use control rule engine 130 monitors media use behaviors of the user 103 and analyzes in the context of the media content environment and the current media use control rule. The media use control rule engine 130 subsequently determines whether or not the user 103 needs a new media use control rule based on the current media use behaviors and the media environment, and generates a new medial control rule if necessary. Detailed operations of the media use control rule engine 130 are presented in FIG. 2 and corresponding description.

The dynamic media use control service as provided by the cognitive media use control system 120 provides media use control that is not only protective of the user 103 but also sufficiently adaptive for the user 103 to the changing media environment such that the user 103 would experience the full extent of media environment that is suitable for the user 103, as evolving according to developmental stages, peer groups, and personal goals and plans of the user 103. As often parents, as the subscriber 101, would be less than knowledgeable with the ever-changing media environment and detailed media use behavior of the user 101 navigating through such media environment, the dynamic media use control service can solve problems caused by static parental control rules on media content use, for both the subscriber 101 and the user 103.

Figure 2:
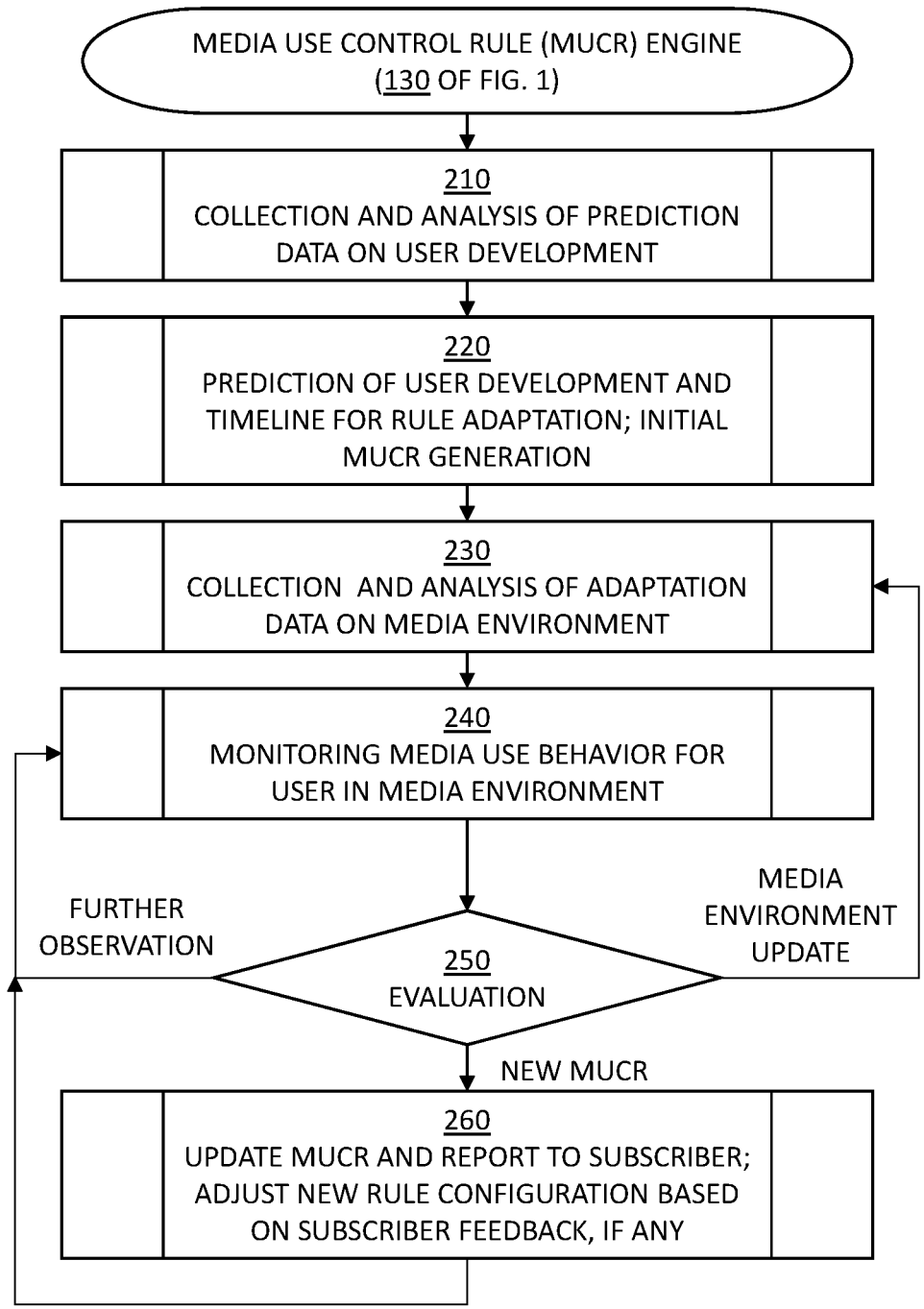
FIG. 2 depicts a flowchart of operations performed by the media use control rule engine, in accordance with one or more embodiments set forth herein.

FIG. 2 depicts a flowchart of operations performed by the media use control rule engine 130, in accordance with one or more embodiments set forth herein.

Prior to block 210, the media use control rule engine 130 controls media use on the controlled device 110 of the user 103 as manually configured by the subscriber 101 according to the user status data 145 of the cognitive media use control system 120.

In block 210, the media use control rule engine 130 collects data from the prediction data source 160 and subsequently analyzes the collected prediction data by use of the cognitive analytics tools 180. Examples of the prediction data include, but are not limited to, general personal background information on the subscriber 101 and the user 103, including demographic information of the subscriber 101 and the user 103, relationship between the subscriber 101 and the user 103, daily routines and activities schedule for the user 103, basic personal information and contact information for the subscriber 101 including availability of the subscriber 101 for any contacts, basic personal information and contact information for friends and member of social groups for the user 103, personal goals and future plans of the user 103, calendar events of the user 103, social network accounts of the user 103 and access authorizations for the subscriber 101, school performance and activity records for the user 103. Then, the media use control rule engine 130 proceeds with block 220.

In one of use cases for embodiments of the present invention, the media use control rule engine 130 identifies a travel schedule in a calendar of the user 101, who is going to stay with many individuals of similar age as the user 103 for two weeks. The media use control rule engine 130 analyzes the destination of the travel, local information relevant to media environment for the user 103, and the relationships with the individuals who would accompany the user 103 during the travel, in order to make predictions on the media environment of the user 103 during the period of travel.

In block 220, the media use control rule engine 130 make predictions on a media environment of the user 103 at a certain time period in the future or in a certain developmental stage, as analyzed based on the prediction data from block 210, by use of the cognitive analytics tools 180, and generates an initial media use control rule for a current stage of the user 103. The media use control rule engine 130 makes predictions on how the user 103 would access the media contents and/or use the controlled device 110 over the same time period, often corresponding to developmental stages of the user 103, for example, school grades in an educational system The media use control rule engine 130 also makes predictions on the peer groups of the user 103 who would accompany and/or be close to the user 103 at the certain time in the future for the predicted media environment. The media use control use engine 130 makes predictions on a developmental stage of the user 103, based on the age/grade level of the user 103 as provided in the prediction data source 160. Then, the media use control rule engine 130 proceeds with block 230.

In one of use cases for embodiments of the present invention, the media use control rule engine 130 discovers that the user 103 is in 10-th grade and wishes to go to a college that admits students with a certain level of grades and extracurricular activities. The user 103 needs to get better grades as requested by the preferred college. The user 103 subsequently joins a study club where the user 103 meets and studies with other students in 10-th grade and working on the college admission qualification, which are now stored in one of the prediction data source 160, as the user 103 marks an event calendar for the study club meetings and other after hour study classes, and/or creates a social media posting that comments on the study plans. The media use control rule engine 130 collects and analyzes the prediction data and make predictions that, for the rest of high school years, the user 103 would focus on studies and activities relevant with college admission, and that other individuals in the study club would be included in the peer group for the user 103, influencing media usage decisions of the user 103.

In block 230, the media use control rule engine 130 collects data from the adaptation data source 170, by use of a web crawler or a data mining robot, and subsequently analyzes the collected adaptation data by use of the cognitive analytics tools 180. Examples of the adaptation data include, but are not limited to, newly released media contents such as books, movies, newspapers, magazines, games, new mobile apps, and any other media content, reviews on the newly released media contents, social media postings on the newly released media contents, responses of peer groups to the newly released media contents, or the like. Then, the media use control rule engine 130 proceeds with block 230.

In block 240, the media use control rule engine 130 monitors both any progress/changes in developmental status and media use behaviors of the user 103 in the media environment as presented in the adaptation data source 170, in the context of the current media use control rule generated from block 220. For example, the media use control rule engine 130 monitors media use behaviors of the user 103 by collecting and analyzing various social media postings by the user 103, calendar entries of the user 103, text messages sent or received by the user 103, media content access patterns on the controlled device 110, or the like, with respect to the updated media environment as analyzed in block 240. Then, the media use control rule engine 130 proceeds with block 250.

In the same use case as in block 220, the media use control rule engine 130 discovers, from the adaptation data sources, that a newly released young adult mystery book is very popular amongst the age group same as the user 103 in block 230. The media use control rule engine 130 in block 240 monitors the media use pattern of the user 103, and discovers that the user 103 talks frequently about the new mystery book with friends and schoolmates, creates many new postings about the new mystery book, and spends a lot of time web surfing on similar mystery books and the works of the author of the new mystery book.

In certain embodiments of the present invention, the media use control rule engine 130 is configured with an observation period for changed media use pattern, in order for the user 103 to explore newly released media and to make decisions on media usage autonomously. Particularly with users in high-teens, as a certain media use behavior could be temporary and the users may get back to normal media use pattern on their own without a new media use control rule, the observation period would be useful in efficiently monitoring such temporary media use pattern. The media use control rule engine 130 can monitor changes with the media use behavior of the user 103 within a certain preset boundary conditions of a current media use control rule, for the preconfigured observation period. If the user 103 continues with the changed media use pattern that deviates from the current media use control rule after the observation period had expired, then, the media use control rule engine 130 would evaluate whether or not the user 103 would be benefited from a new media use control rule.

In block 250, the media use control rule engine 130 determines whether or not a new media use control rule should be generated, based on the monitored status of the user 103 from block 240 in a present media environment. The monitored status of the user 103 as represented in the user status data 145 include media use behaviors, current developmental stage or any social circumstances have been changes for the user 103 to mandate a new media use control rule. If the media use control rule engine 130 determines that the monitored user status 145 mandates the new media use control rule, then, the media use control rule engine 130 proceeds with block 260. If no data mandating the new media use control rule has been monitored from block 240, then the media use control rule engine 130 continues monitoring in block 240.

Further in block 250, the media use control rule engine 130 also determines whether or not the media environment as updated from block 230 is still effective to evaluate the media use behavior of the user 103 monitored from block 240. If the media use control rule engine 130 determines that the media environment is still applicable, then the media use control rule engine 130 loops back to block 240. If the media use control rule engine 130 determines that the media environment as applied in monitoring of the user 103 in block 240 has expired, then the media use control rule engine 130 loops back to block 230 to update the media environment from any changes in the adaptation data.

Further in block 250, if the media use control rule engine 130 determines that the media environment applied in monitoring of the user 103 in block 240 does not align with the user status data 145, then the media use control rule engine 130 proceeds with block 260 to generate a new media use control rule. For example, the user 103 may have been following the same media control rule for a while, but in the meantime, the school of the user 103 launched a new school website for providing class study materials, schedules for school events, and emergencies, which the user 103 is recommended to check regularly. The media control use rule engine 130 processes the adaptation data on the new school website and determines, due to the change in the media environment of the user 103, that a new media use control rule that accommodates additional time for the new school website should be generated, with respect to the user status data 145 as collected from block 240, demonstrating that the current hourly limits are fully utilized for other media activities that are just as important as the school website.

In certain embodiments of the present invention, the media use control engine 130 performs blocks 230 and 240 concurrently, with a feedback loop between blocks 230 and 240, in order to maintain the media environment used for monitoring the user 103 up-to-date with any changes in the adaptation data. In certain embodiments of the present invention, the media use control engine 130 runs block 230 for collecting and analyzing the adaptation data as a background process in order to update the media environment continuously based on each new arrival of new adaptation data, or to update the media environment periodically based on cumulated new adaptation data during a preconfigured interval, for example, daily.

In block 260, the media use control rule engine 130 updates the existing media use control rule according to the adaptation data and the user status data 145, and reports the updated media use control rule to the subscriber 101. The media use control rule engine 130 applies results from the evaluation made in block 250 based on the adaptation data processed from block 230 and the user status data 145 processed from block 240. The media use control rule engine 130 and/or the cognitive media use control system 120 provides an interface by which the subscriber 101 can input feedback as to the new media use control rule, or configuration thereof. If the subscriber 101 inputs feedback, the media use control rule engine 130 updates the configuration of the media use control rule accordingly. Then, the media use control rule engine 130 loops back to block 240 for further monitoring.

The media use control rule 140 controls usage of the controlled device 110 as well as accesses to media contents in the media environment by the user 103 through the controlled device 110, as noted. The media use control rule engine 130 generates the new media use control rule 140 by compiling an updated list of websites that the user 103 can access and use to the benefit of the user 103 in the current developmental stage as analyzed based on the prediction data, based on the website content and age-appropriateness of the respective website contents, with respect to changes in the media environment as well as the changes in the media use behavior of the user 103. The media use control rule engine 130 can also adjust the hours and timeframe of use permitted for the controlled device 110. For example, if there were no previous hourly and/or time limit on the use of the controlled device 110, the media use control rule engine 130 can set a new limit on hours and timeframe as the user 103 develops a habit of talking on the phone hours at night and being late for school the next morning, in order to prevent the use of phone overnight except calls to preconfigured emergency numbers.

In certain embodiments of the present invention, the media use control rule 140 is implemented as a series of commands upon the controlled device 110, according to specifications of the controlled device 110. In order to apply the media use control rule 140 on the controlled device 110, an agent program of the cognitive media use control system 120 can be installed on the controlled device 110. In certain embodiments of the present invention, the media use control rule 140 can be tailored to functionalities of the controlled device 110 that is commercially available, in which case the media use control rule 140 can be limited based on the functionalities of the controlled device 110. In the alternative, the controlled device 110 can be manufactured specifically for the purpose of the dynamic media use control service and as a user interface of the cognitive media use control system 120, such that the controlled device 110 can perform all the instructions of the media use control rule 140.

Certain embodiments of the present invention provides dynamic media use control rule upon a controlled device for a user based on data mining and analyses of comprehensive background information on the user, changes in media environment, monitored media use behaviors of the user, and general information about media use control in media environments. Certain embodiments of the present invention make predictions on developmental stages of the user and respective media use needs per developmental stage, based on prediction data, indicating the comprehensive background information on the user, by use of cognitive analytics tools. Certain embodiments of the present invention collects, by use of a web crawler or a data mining robot, and analyzes adaptation data, indicating the changes in the media environment, by use of the cognitive analytics tool, including natural language processing, image analysis, context analysis, etc. Certain embodiments of the present invention monitors media use behaviors of the user on the controlled device while applying a certain media control use rule to the controlled device. Certain embodiments of the present invention automatically adjusts the media use control rule for the user as needed according to changes in the media environment, time lapse according to the developmental stage/events of the user, and changes in the media use behaviors of the user. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription. The dynamic media use control service can be provided for subscribed business entities/vendors of software applications in need from any location in the world.

Figure 3:
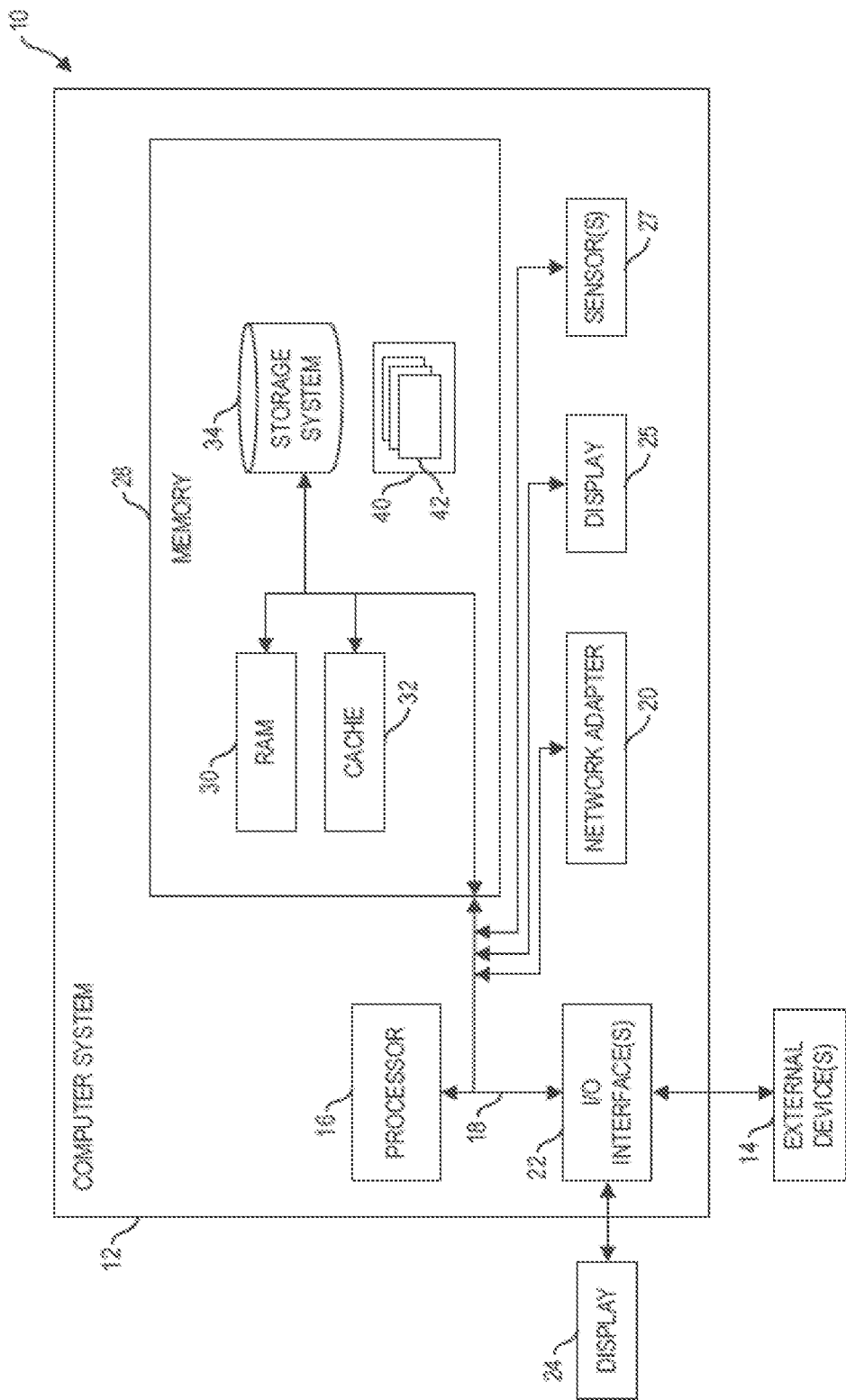
FIG. 3 depicts a cloud computing node according to an embodiment of the present invention.
Figure 4:
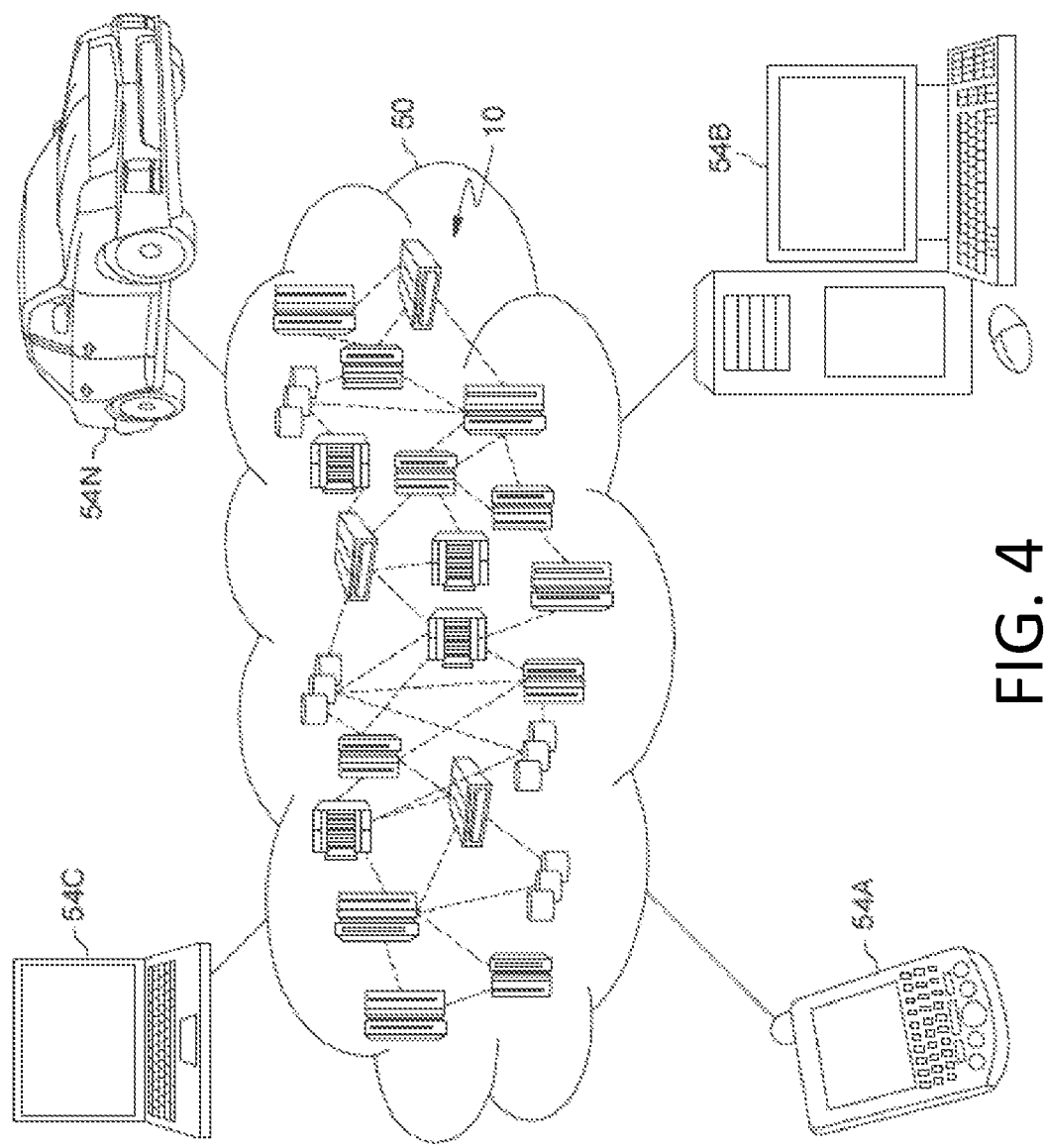
FIG. 4 depicts a cloud computing environment according to an embodiment of the present invention.
Figure 5:
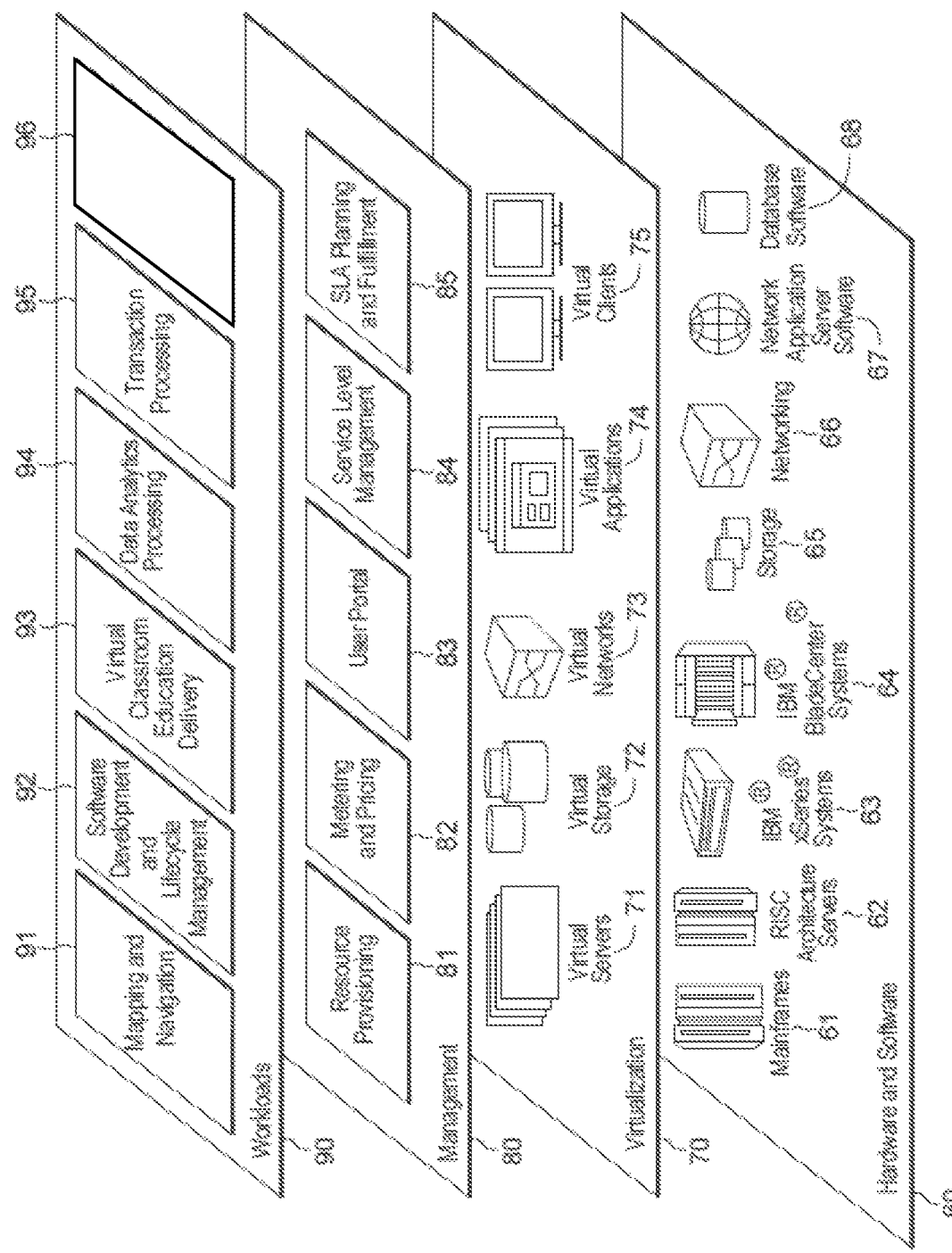
FIG. 5 depicts abstraction model layers according to an embodiment of the present invention.

FIGS. 3-5 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the media use control rule engine 130 of the cognitive media use control system 120 of FIG. 1, respectively. Program processes 42, as in the media use control rule engine 130 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the dynamic media use control service as provided by the cognitive media use control system in combination with the controlled device 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining, by one or more processor, prediction data that are indicative of media use behaviors of a user over a period of time;
    predicting, by the one or more processor, a pattern of the media use behaviors including media content, hours spent on the media content, and the period of time during which the user would behave as predicted;
    generating, by the one or more processor, a media use control rule for the user on a controlled device according to the predicted media use pattern corresponding to a current stage in the period of time;
    ascertaining a capacity of the media use control rule to accommodate changes in a media environment for the user; and
    responsively updating the media use control rule.

2. The computer implemented method of claim 1, further comprising:
    obtaining adaptation data that represents changes in a media environment of the user; and
    monitoring the media use behaviors of the user on the controlled device in the context of the adaptation data and the media use control rule.

3. The computer implemented method of claim 2, further comprising:
    ascertaining that the media use control rule is effective for the user based on the monitored media use behaviors of the user on the controlled device and the adaptation data; and
    continuing with the monitoring of the media use behaviors of the user based on the media use control rule as ascertained.

4. The computer implemented method of claim 2, further comprising:
    ascertaining that adaptation data is to be updated for the media use control rule, based on the changes in the media environment of the user during the time taken for the monitoring; and
    continuing with the obtaining the adaptation data that represents further changes in the media environment of the user.

5. The computer implemented method of claim 2, further comprising:
    ascertaining that the media use control rule is to be updated because the media use control rule had expired as the current stage in the period of time predicted for the media use control rule had lapsed, or because the media use control rule does not accommodate the changes in the media environment for the user; and
    updating the media use control rule based on the changes in the media environment as represented in the adaptation data and another predicted media use pattern corresponding to a next stage in the period of time.

6. The computer implemented method of claim 1, wherein the media content include: websites, video games, mobile apps, social media, emails, text messengers, video chats, voice calls, and combinations thereof that can be accessed via the controlled device.

7. The computer implemented method of claim 1, wherein the prediction data include: general personal background information on the user such as demographic information, daily routines and activities schedule for the user, basic personal information and contact information for friends and member of social groups for the user, personal goals and future plans of the user, calendar events of the user, social network accounts of the user, school performance and activity records for the user.

8. The computer implemented method of claim 1, further comprising: ascertaining that the media use control rule is to be updated because the media use control rule does not accommodate changes in the media environment for the user; and updating the media use control rule based on the changes in the media environment and another predicted media use pattern corresponding to a next stage in the period of time.

9. The computer implemented method of claim 1, wherein the ascertaining comprises ascertaining that the media use control rule does not accommodate changes in the media environment for the user; and responsively updating the media use control rule.

10. The computer implemented method of claim 1, further comprising: controlling the controlled device in accordance to an updated media use control rule subsequent to expiration of the media use control rule, wherein the media use control rule is configured to expire when the current stage in the period of time predicted for the media use control rule lapses.

11. The computer implemented method of claim 1, further comprising: monitoring media use behaviors of the user on the controlled device in the context of changes in a media environment of the user and the media use control rule; and updating the media use control rule in dependence on a result of the monitoring.

12. A computer program product comprising:
a computer readable storage medium readable by one or more processor and storing instructions for execution by the one or more processor for performing a method comprising:
obtaining prediction data that are indicative of media use behaviors of a user over a period of time;
predicting, by the one or more processor, a pattern of the media use behaviors including media content, hours spent on the media content, and the period of time during which the user would behave as predicted;
generating, by the one or more processor, a media use control rule for the user on a controlled device according to the predicted media use pattern corresponding to a current stage in the period of time;
ascertaining a capacity of the media use control rule to accommodate changes in a media environment for the user; and
responsively updating the media use control rule.

13. The computer program product of claim 12, further comprising:
obtaining adaptation data that represents changes in a media environment of the user; and
monitoring the media use behaviors of the user on the controlled device in the context of the adaptation data and the media use control rule.

14. The computer program product of claim 12, wherein the prediction data include: general personal background information on the user such as demographic information, daily routines and activities schedule for the user, basic personal information and contact information for friends and member of social groups for the user, personal goals and future plans of the user, calendar events of the user, social network accounts of the user, school performance and activity records for the user.

15. A system comprising:
a memory;
one or more processor in communication with the memory; and
program instructions executable by the one or more processor via the memory to perform a method comprising:
obtaining prediction data that are indicative of media use behaviors of a user over a period of time;
predicting, by the one or more processor, a pattern of the media use behaviors including media content, hours spent on the media content, and the period of time during which the user would behave as predicted;
generating, by the one or more processor, a media use control rule for the user on a controlled device according to the predicted media use pattern corresponding to a current stage in the period of time;
ascertaining a capacity of the media use control rule to accommodate changes in a media environment for the user; and
responsively updating the media use control rule.

16. The system of claim 15, further comprising:
obtaining adaptation data that represents changes in a media environment of the user; and
monitoring the media use behaviors of the user on the controlled device in the context of the adaptation data and the media use control rule.

17. The system of claim 16, further comprising:
ascertaining that the media use control rule is effective for the user based on the monitored media use behaviors of the user on the controlled device and the adaptation data; and
continuing with the monitoring of the media use behaviors of the user based on the media use control rule as ascertained.

18. The system of claim 16, further comprising:
ascertaining that adaptation data is to be updated for the media use control rule, based on the changes in the media environment of the user during the time taken for the monitoring; and
continuing with the obtaining the adaptation data that represents further changes in the media environment of the user.

19. The system of claim 16, further comprising:
ascertaining that the media use control rule is to be updated because the media use control rule had expired as the current stage in the period of time predicted for the media use control rule had lapsed, or because the media use control rule does not accommodate the changes in the media environment for the user; and
updating the media use control rule based on the changes in the media environment as represented in the adaptation data and another predicted media use pattern corresponding to a next stage in the period of time.

20. The system of claim 15, wherein the media content include: websites, video games, mobile apps, social media, emails, text messengers, video chats, voice calls, and combinations thereof that can be accessed via the controlled device, and wherein the prediction data include: general personal background information on the user such as demographic information, daily routines and activities schedule for the user, basic personal information and contact information for friends and member of social groups for the user, personal goals and future plans of the user, calendar events of the user, social network accounts of the user, school performance and activity records for the user.

* * * * *